United States Patent
Batchelder et al.

(10) Patent No.: US 8,670,577 B2
(45) Date of Patent: Mar. 11, 2014

(54) ELECTRONICALLY-SIMULATED LIVE MUSIC

(75) Inventors: James Batchelder, Somers, NY (US); J. Samuel Batchelder, Somers, NY (US)

(73) Assignee: Convey Technology, Inc., Somers, NY (US)

( * ) Notice: Subject to any disclaimer, the term of this patent is extended or adjusted under 35 U.S.C. 154(b) by 650 days.

(21) Appl. No.: 12/906,647

(22) Filed: Oct. 18, 2010

(65) Prior Publication Data
US 2012/0093343 A1  Apr. 19, 2012

(51) Int. Cl.
*H04B 1/00* (2006.01)
*G06F 17/00* (2006.01)

(52) U.S. Cl.
USPC ............................................ 381/119; 700/94

(58) Field of Classification Search
USPC ................ 381/118, 119, 123; 700/94; 84/477
See application file for complete search history.

(56) References Cited

U.S. PATENT DOCUMENTS

| | | |
|---|---|---|
| 5,524,075 A | 6/1996 | Rousseau et al. |
| 5,663,517 A | 9/1997 | Oppenheim |
| 5,749,073 A | 5/1998 | Slaney |
| 5,973,252 A | 10/1999 | Hildebrand |
| 6,121,533 A | 9/2000 | Kay |
| 6,469,240 B2 | 10/2002 | Pachet et al. |
| 6,683,241 B2 | 1/2004 | Wieder |
| 6,748,355 B1 | 6/2004 | Miner et al. |
| 7,078,607 B2 | 7/2006 | Alferness |
| 7,091,409 B2 | 8/2006 | Li et al. |
| 7,319,185 B1 | 1/2008 | Wieder |
| 7,461,002 B2 | 12/2008 | Crockett et al. |
| 7,610,205 B2 | 10/2009 | Crockett |
| 7,711,123 B2 | 5/2010 | Crockett |
| 7,754,955 B2 * | 7/2010 | Egan ................................ 84/600 |
| 7,792,681 B2 | 9/2010 | Covell et al. |
| 2009/0114079 A1 * | 5/2009 | Egan ........................... 84/477 R |
| 2010/0021125 A1 | 1/2010 | Ingrosso et al. |
| 2010/0202630 A1 | 8/2010 | Lindahl et al. |
| 2010/0322042 A1 * | 12/2010 | Serletic et al. .................... 369/1 |
| 2012/0014673 A1 * | 1/2012 | O'Dwyer ....................... 386/282 |

OTHER PUBLICATIONS

M. Slaney, M. Covell, and B. Lassiter: "Automatic audio morphing", 1996 International Conference on Acoustics, Speech, and Signal Processing, Atlanta, GA, May 7-10, 1996.

* cited by examiner

*Primary Examiner* — Fan Tsang
*Assistant Examiner* — Eugene Zhao
(74) *Attorney, Agent, or Firm* — Brian R. Morrison; Westman, Champlin & Koehler, P.A.

(57) ABSTRACT

A method for producing an electronically-simulated live musical performance, the method comprising providing morph-friendly solo tracks, morphing the morph-friendly solo tracks to produce a morphed track, and post-processing the morphed track. The method may also include combining the post-processed morphed track with one or more supporting tracks to produce an acoustic image for playback.

20 Claims, 6 Drawing Sheets

ELECTRONICALLY-SIMULATED LIVE MUSIC

BACKGROUND

The present disclosure is directed to techniques and systems for providing musical performances. In particular, the present disclosure is directed to the creation and playback of electronically-simulated live music from static recorded information.

Common methods for the creation and playback of recording-industry music are fixed and static. Each time an artist's composition is played back, it sounds essentially identical. Examples of static music in use today include the playback of music on records, analog and digital tapes, compact discs, digital versatile discs, and MP3s. Common to all these approaches is that on playback, the listener is exposed to the same audio experience every time the composition is played.

An advantage of static music is that detailed and polished post processing can be applied to the constituent components of the music in a studio. However, a significant disadvantage of static music is that listeners typically prefer the freshness of live performances. Static music falls significantly short compared with the experience of a live performance. Though a live musical performance rarely has the perfection of a produced studio recording, it however offers an attractive freshness in unexpected-but-appropriate novel nuances. Another disadvantage of static music is that an artist's composition is limited to a single fixed and unchanging version. The artist is unable to incorporate spontaneous creative effects associated with live performances into their static compositions. This imposes a significant limitation on the creativity of the artist compared with live music.

SUMMARY

A first aspect of the present disclosure is directed to a method for producing an electronically-simulated live musical performance. The method includes creating a plurality of solo performance tracks, and converting the solo performance tracks into a morph-friendly format to provide morph-friendly solo tracks. The method also includes providing post-processing instructions configured to be applied to a morphed track of the morph-friendly solo tracks, and copying the morph-friendly solo tracks and the post-processing instructions to a storage medium.

Another aspect of the present disclosure is directed to a method for producing an electronically-simulated live musical performance, where the method includes reading a plurality of morph-friendly solo tracks from a storage medium with a processor of a media player. The method also includes morphing the plurality of morph-friendly solo tracks with the processor to produce a morphed track, reading post-processing instructions from the distribution medium with the processor, and applying the post-processing instructions to the morphed track with the processor.

Another aspect of the present disclosure is directed to a storage medium configured to be read by a processor of a media player. The storage medium includes a plurality of morph-friendly solo tracks, at least one supporting performance track, post-processing instructions configured to be applied to a morphed track of the morph-friendly solo tracks, and mixing and normalizing instructions configured to be applied to the morphed track and to the at least one supporting performance track.

DETAILED DESCRIPTION

The present disclosure is directed to a method for producing electronically-simulated live ("eLive") musical performances from static recorded information retained on a storage medium (e.g., a compact disc). As discussed below, the static recorded information includes one or more "supporting tracks", which are background performance tracks that are processed and copied to a storage medium, and multiple "solo tracks" for each supporting track that are provided in a morph-friendly format and copied to the storage medium. During a playback of a song or other suitable piece from the storage medium, a media player generates a random combination of the solo tracks to provide a morphed track. The morphed track is then post-processed and combined with a respective supporting tracks to provide an audio performance of the song.

During each subsequent playback of the same song, the media player generates a new random combination of the solo tracks to provide a new morphed track that is different from the previous morphed tracks. The new morphed track is then post-processed and combined with the respective supporting tracks to provide a new audio performance of the song that differs from the previously played song. The different morphed tracks accordingly simulate the variations provided by live musical performances, which allows artists to show a greater range of artistic approaches.

Figure 1:
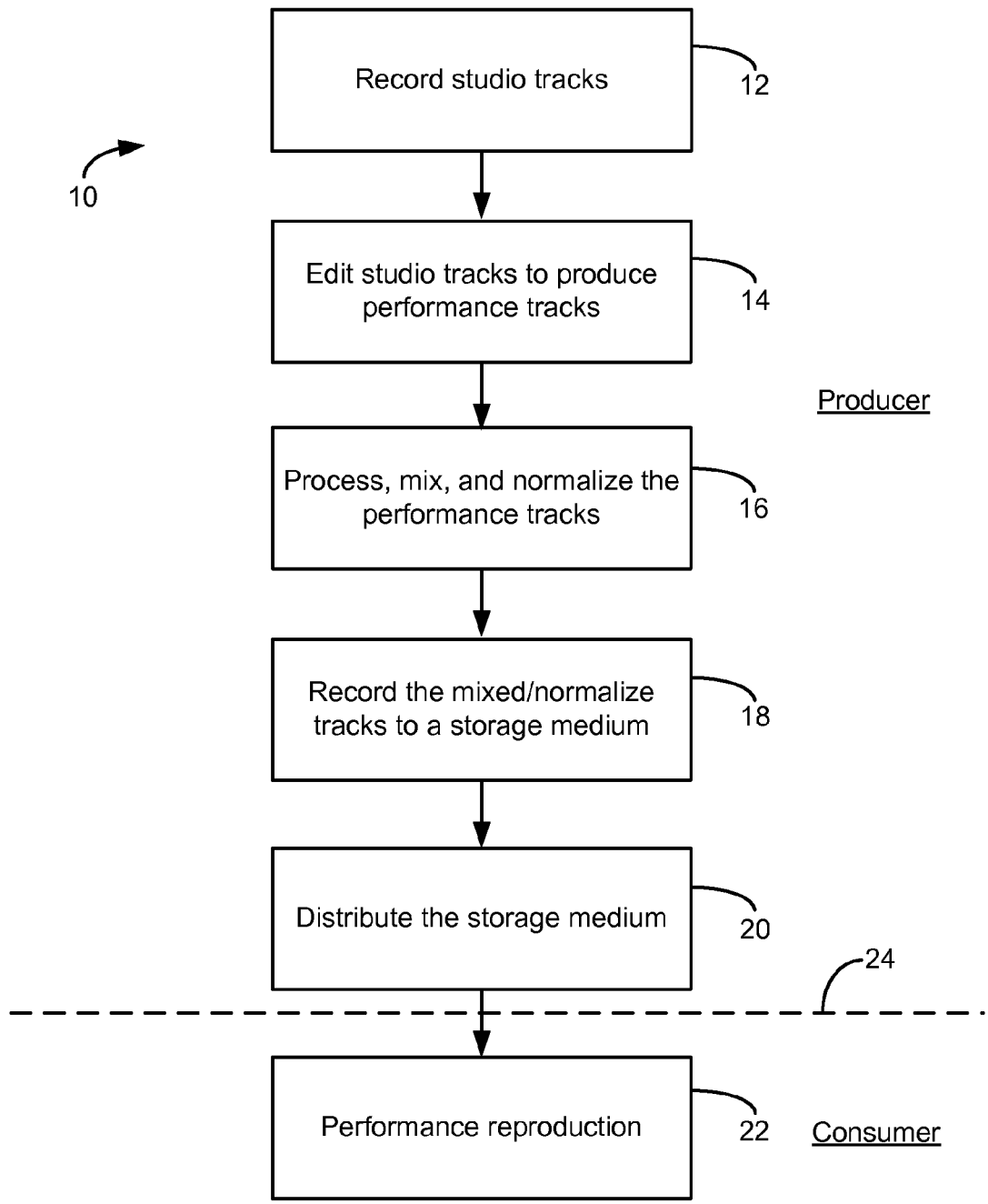
FIG. 1 is a flow diagram of a prior art process for creating and reproducing static musical performances.

Common methods for the creation and playback of recording-industry music are fixed and static. As shown in FIG. 1, method 10 illustrates a typical process for creating and playing recording-industry music. This initially involves having the artists record multiple studio tracks (step 12), which are then edited to produce static performance tracks (step 14). The performance tracks are then processed, mixed, and normalized to a data format that is compatible with a storage medium (step 16). The performance tracks are then recorded to the storage medium (step 18) and the storage medium is distributed to the public for consumer purchase (step 20).

A consumer may then purchase the storage medium and play the performance tracks in a media player, which reproduces the performance tracks (step 22). As discussed above, these reproduced performance tracks are static. As shown in FIG. 1, method 10 is generally divided into a producer portion and a consumer portion, as illustrated by line 24, where steps 12-20 are performed in the producer portion. As such, all of the processing, mixing, and normalization of the performance tracks are performed in the producer portion above line 24, thereby providing static performance tracks. In comparison, in the consumer portion below line 24, the performance reproduction of step 22 merely reads the static performance tracks from the storage medium and plays them in from a media player. As such, each time an artist's composition is played back, it sounds essentially identical, and the consumer is exposed to the same audio experience every time the performance tracks are played.

Figure 2:
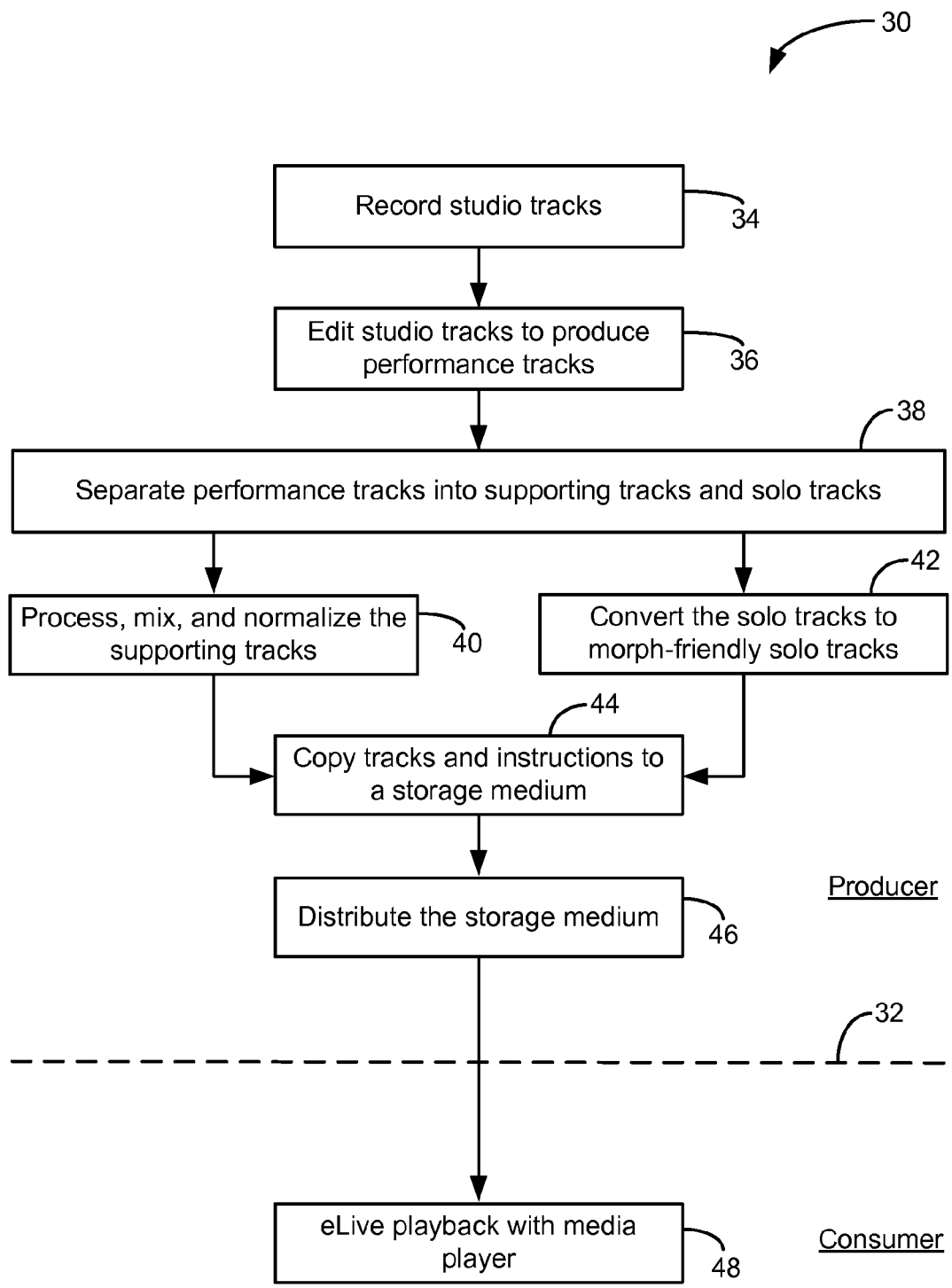
FIG. 2 is a flow diagram of a method of the present disclosure for creating and reproducing electronically-simulated live music.

FIG. 2 illustrates method 30, which is an example of a suitable method of the present disclosure for providing eLive musical performances with a media player. In comparison to method 10 (shown in FIG. 1), the music created and played pursuant to method 30 has different playback variations, thereby simulating the variations provided by live musical performances. As shown in FIG. 2, method 30 is divided at line 32 into a producer portion and a consumer portion, and includes steps 34-46 above line 32 (i.e., in the producer portion) and step 48 below line 32 (i.e., in the consumer portion).

Method 30 initially involves recording or otherwise copying studio tracks from a variety of sources (step 34), and editing the studio tracks to produce performance tracks (step 36). Steps 34 and 36 may generally be performed in a conventional manner to attain desired performance tracks. The performance tracks are then separated into two categories of tracks, referred to as supporting tracks and solo tracks (step 38). In other words, the producer may identify a first portion of the performance tracks as the supporting tracks, which are the intended background performance tracks that desirably remain static during playback. Additionally, the producer may identify a second portion of the performance tracks as the solo tracks, which are performance tracks that provide variations in the playback songs.

Accordingly, a given song on a storage medium may include multiple supporting tracks along with two or more solo tracks that relate to the supporting track. In this embodiment, for a given song, the supporting tracks function as the background channels for the song, and the solo tracks cover a particular musical piece in the song, where the solo tracks desirably differ from each other, such as by timing, tempo, pitch, and the like. For example, the solo tracks may cover an instrument solo that occurs in the song, where each solo track may be based on a different studio track of the instrument solo.

A song stored on the storage medium typically includes a group of supporting tracks (i.e., multiple background channels). However, in some embodiments, each song stored of the storage medium may include a single supporting track. Accordingly, the method of the present disclosure may be implemented to mix one or more supporting tracks with one or more processed, morphed tracks, as discussed below.

After being identified in step 38, the supporting tracks are then post-processed, mixed, and normalized to a data format that is compatible with a storage medium (e.g., a linear pulse code modulation (LPCM) audio file format for use with a compact disc) (step 40). The solo tracks, however, desirably remain in a non-post-processed state in the producer portion of method 30. As discussed below, post-processing may obscure the source notes, diction, attack, timing, and character of natural instrument music, which can inhibit a subsequent morphing of the solo tracks. As such, the morphing step, which is performed in the consumer portion, is desirably applied prior to any post-processing step.

Instead, the solo tracks are converted and/or compressed into "morph-friendly solo tracks" having a morph-friendly format (step 42). As discussed below, the morph-friendly solo tracks are suitable for being morphed together in a random manner to provide the morphed tracks that are different during each playback. This provides the variations between playbacks of the same song. Examples of suitable morph-friendly formats include a linear predictive coding format, a wavelet format, and combinations thereof.

The processed/mixed/normalized group of supporting tracks and the morph-friendly solo tracks are then copied to a storage medium (step 44). The storage medium used may vary depending on the desired distribution means. In one embodiment, the storage medium may be a data storage medium configured to be physically purchased and retained by a customer, such as an optical disc (e.g., a compact disc and a digital versatile disc). Alternatively, the storage medium may be a data storage medium configured to transmit the songs over one or more transmission lines to a media player storage medium owned by the consumer, such as through an Internet purchase and download. In this example, the storage medium may be a computer-based, data storage device (e.g., a hard disk drive or a solid-state drive).

The term "storage medium" includes any data storage medium configured to be read by a media player. Examples of suitable storage media include optical media (e.g., compact discs and digital versatile discs), magnetic media (e.g., magnetic disks and magnetic film), solid-state media, analog media, and the like. Furthermore, the term "media player" includes one or more devices configured to directly or indirectly playback audio data, such as multimedia players (e.g., portable multimedia players), computer-based systems (e.g., desktop computers, laptop computers, and server-based systems), stand-alone music players (e.g., stereo systems), personal digital assistants (PDAs), telecommunication devices, and the like.

Accordingly, pursuant to step 44 of method 30, the group of supporting tracks may be copied to the storage medium along with two or more morph-friendly solo tracks. In addition, (i) instructions for morphing the morph-friendly solo tracks into a morphed track, (ii) instructions for post-processing the morphed tracks, and (iii) instructions for mixing and normalizing the morphed tracks with the group of supporting tracks may be copied to the storage medium.

The storage medium may then be distributed for consumer purchase (step 46). The particular distribution means may vary depending on the storage medium, the intended consumers, and the like. For example, in embodiments in which the storage medium is an optical disc (e.g., a compact disc and a digital versatile disc), the media may be sold through retails stores, through Internet purchases, and the like. Alternatively, the distribution may be performed through an Internet transaction in which the consumer purchases and downloads a copy of the data from the storage medium to a second remote storage medium, such as to data storage device of a media player.

After purchasing the storage medium, the consumer may then playback the one or more songs from the storage medium with a media player, as discussed below (step 48). During each playback of the same song, the media player generates a new random combination of the morph-friendly solo tracks to provide a new morphed track that is different from the previous morphed tracks. Each new morphed track is post-processed and combined with a respective supporting track to provide a new audio performance of the song that differs from the same song previously played. The different morphed tracks accordingly simulate the variations provided by live musical performances.

Figure 3:
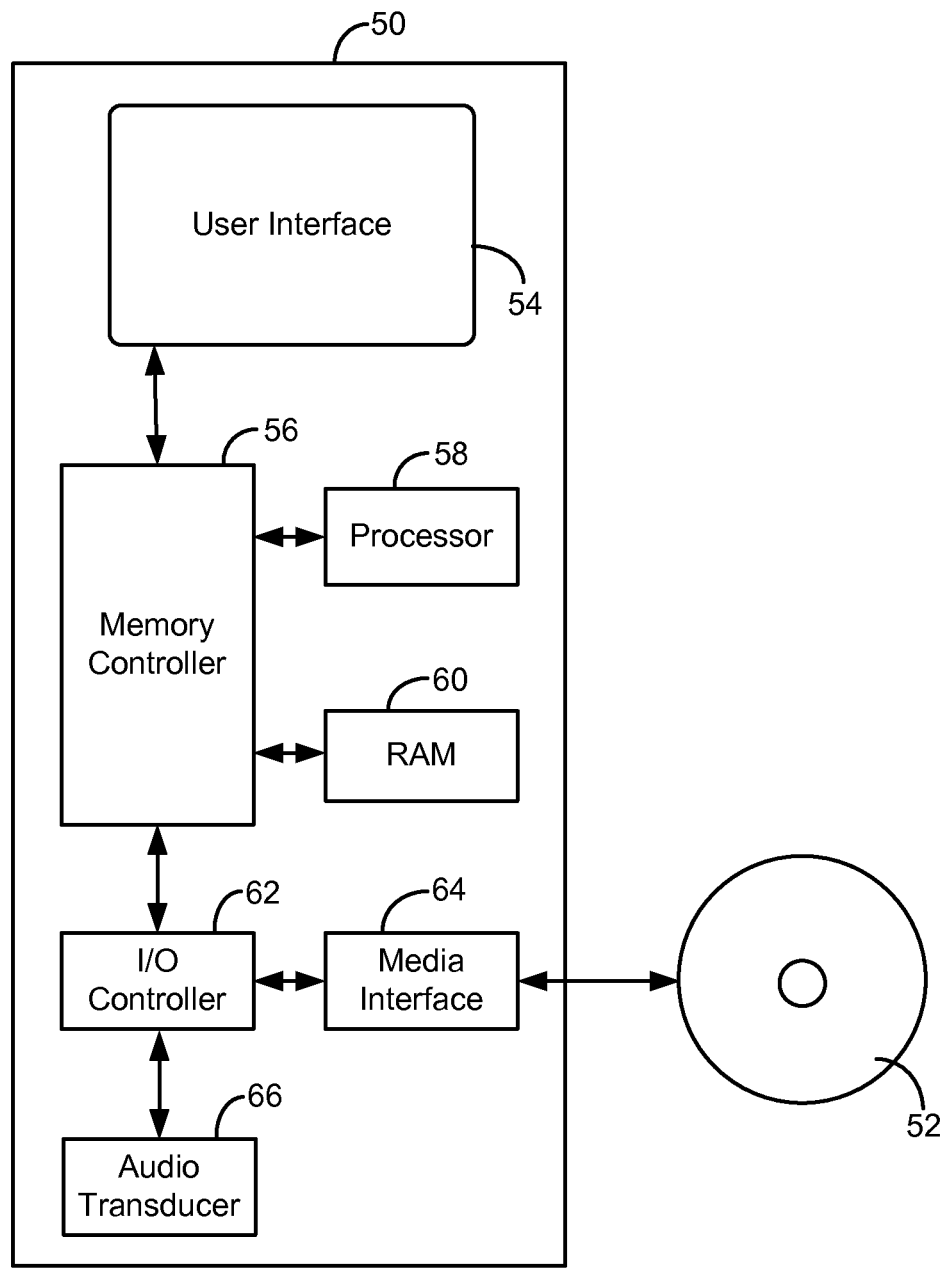
FIG. 3 is a schematic illustration of a media player in use with a storage medium.

FIG. 3 illustrates media player 50 in use with storage medium 52, where media player 50 is an example of a suitable media player for producing eLive musical performances from data retained on storage medium 52. In the shown embodiment, media player 50 includes user interface 54, memory controller 56, processor 58, RAM 60, input/output (I/O) controller 62, media interface 64, and audio transducer 66, which may be conventional components of a media player.

Media player 50 may also include a variety of additional components that are contained in computer-based systems. For example, reasonably powerful processors are typically required for some of the post-processing effects. As such, field-programmable gate arrays (FPGAs) and special purpose hardware may be incorporated in media player 50 to perform one or more of the post-processing effects. Since specific post-processing effects are generally adjustable (e.g., the coefficients of digital delay filters), these adjustable parameters may be contained in the instructions for post-processing the morphed tracks.

User interface 54 is operating system or other user-operated interface (e.g., keyboards and other hand-operated controls) configured to operate media player 50. Memory controller 56 is a circuit assembly that interfaces the components of media player 50 with RAM 60. Processor 58 is one or more processing units, and RAM 60 is one or more volatile random access memory modules. Media player 50 may also include one or more read-only memory modules (not shown) for storage of firmware and the like. I/O controller 66 is a circuit assembly that interfaces memory controller 56, processor 58, and RAM 60 with various input and output components of media player 50, including media interface 64 and audio transducer 66. Media interface 64 is an interface that allows media player 50 to engage and read information from recordable medium 52. Audio transducer 66 is a hardware assembly configured to produce the audio output from media player 50.

While storage medium 52 is illustrated in FIG. 3 is a separate disc from media player 50, storage medium 52 may alternatively be located within a housing of media player 50, such as a data storage device within a portable multimedia player. As discussed above, examples of suitable storage media for storage medium 52 include optical media, magnetic media, solid-state media, analog media, and the like.

Figure 4:
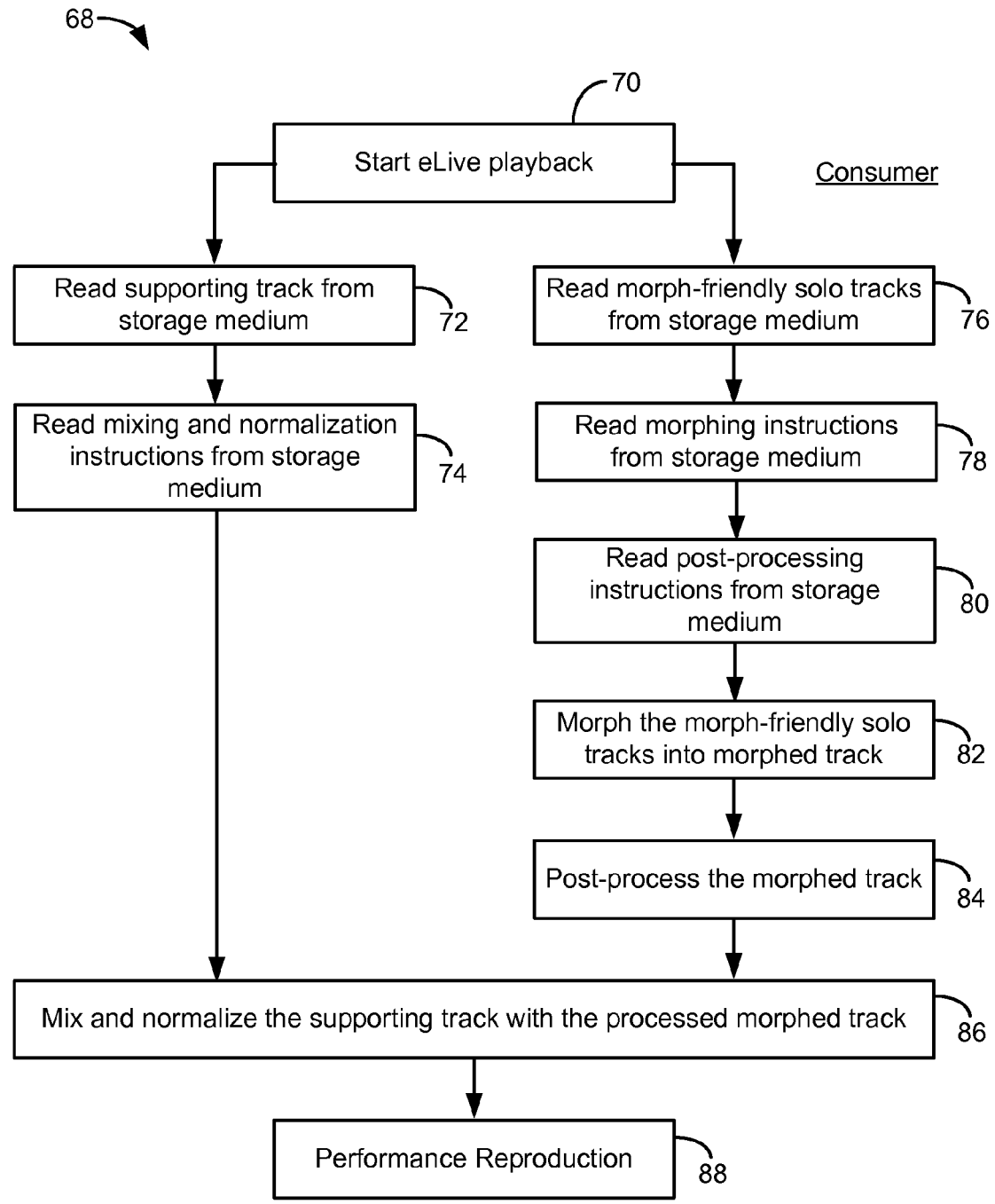
FIG. 4 is a flow diagram of an exemplary method of the present disclosure for reproducing electronically-simulated live music.

FIG. 4 is a flow diagram of method 68, which is an example of a suitable method for performing the eLive playback by the consumer, pursuant to step 48 of method 30 (shown in FIG. 2). The following discussion of method 68 is made with reference to media player 50 and storage medium 52 (shown in FIG. 3) with the understanding that method 68 may be performed with a variety of different media players and storage media. As shown in FIG. 4, method 68 includes steps 70-88, and initially involves starting the eLive playback with media player 50 and storage medium 52 (step 70). For example, the consumer may direct media player 50 to begin playback of a particular song from storage medium 52.

For a given song, media player 50 may read the group of supporting tracks from storage medium 52 to RAM 60 with the use of processor 58 (step 72). Media player 50 may also read instructions for mixing and normalizing the group of supporting track with a subsequent morphed track to RAM 60 with the use of processor 58 (step 74). Additionally, media player 50 may also read the morph-friendly solo tracks that relate to the group of supporting tracks to RAM 60 with the use of processor 58 (step 76). Media player 50 may also read instructions for morphing the morph-friendly solo tracks into a morphed track (step 78) and instructions for post-processing the morphed track (step 80) to RAM 60 with the use of processor 58. In alternative embodiments, one or more of the mixing/normalizing instructions, the morphing instructions, and the post-processing instructions may be obtained from one or more separate storage media of media player 50, rather than being read from storage medium 52.

Media player 50 may then randomly morph the morph-friendly solo tracks into a morphed track with the use of processor 58, pursuant to the morphing instructions obtained in step 78 (step 82). The particular morph combination is desirably maintained over an artistically sensible portion of the musical piece, like a song or movement. An example of the morphing process pursuant to step 82 is discussed below. The morphed track is then post-processed with the use of processor 58 (and any other dedicated hardware), pursuant the post-processing instructions obtained in step 80 (step 84). As discussed above, post-processing may obscure the source notes, diction, attack, timing, and character of natural instrument music, which can inhibit a subsequent morphing of the morph-friendly solo tracks. As such, media player 50 desirably performs morphing step 82 prior to post-processing step 84, as shown in FIG. 4.

Examples of suitable post-processing effects that may be performed on the morphed track include amplification, digitization, data compression, normalization, dubbing, equalization, dynamic compression, dynamic expansion, pitch correction, de-essing, thickening and enhancing, harmonization, delay formation, time alignment, tempo change, and combinations thereof. The selection, order of application, and relative prominence of each post-processing effect are based on the post-processing instructions obtained in step 80. As such, the post-processing instructions are desirably created by audio engineers (in the producer portion) to attain appropriate combinations of the post-processing effects across the range of solo tracks.

Media player 50 then combines, mixes, and normalizes the group of supporting tracks with the post-processed, morphed track with the use of processor 58, pursuant to the mixing and normalization instructions obtained in step 74, to attain a desired acoustic image that may be stored in RAM 60 (step 86). The post-processed, morphed track generally shares reproduction channels with the supporting tracks, which may be specified by the mixing and normalization instructions. For example, the channel panning and peak amplitude in one performance may be different than another, creating a morphed track that is different than any source. When this morphed track is mixed with the supporting tracks, the change in the peak amplitude forces the overall normalization to be different, as well as the relative channel position of the morphed track.

The acoustic image may then be played by media player 52 through audio transducer 66 (step 88). As shown in FIGS. 2 and 4, in methods 30 and 68 of the present disclosure (shown in FIGS. 2 and 4), a portion of the post-processing and mixing/normalizing is performed in the consumer portion (i.e., below line 32, shown in FIG. 2), which occurs after the supporting tracks and the solo tracks are copied to storage medium 52. In comparison, in method 10 (shown in FIG. 1), all of the post-processing is performed in the producer portion (above line 24, shown in FIG. 1), which occurs prior the performance tracks being copied to the storage medium. This difference in the post-processing steps allows the morphing of the morph-friendly solo tracks to occur in the consumer portion rather than being limited to the producer portion. This accordingly allows the different morphed tracks to simulate the variations provided by live musical performances.

Figure 5:
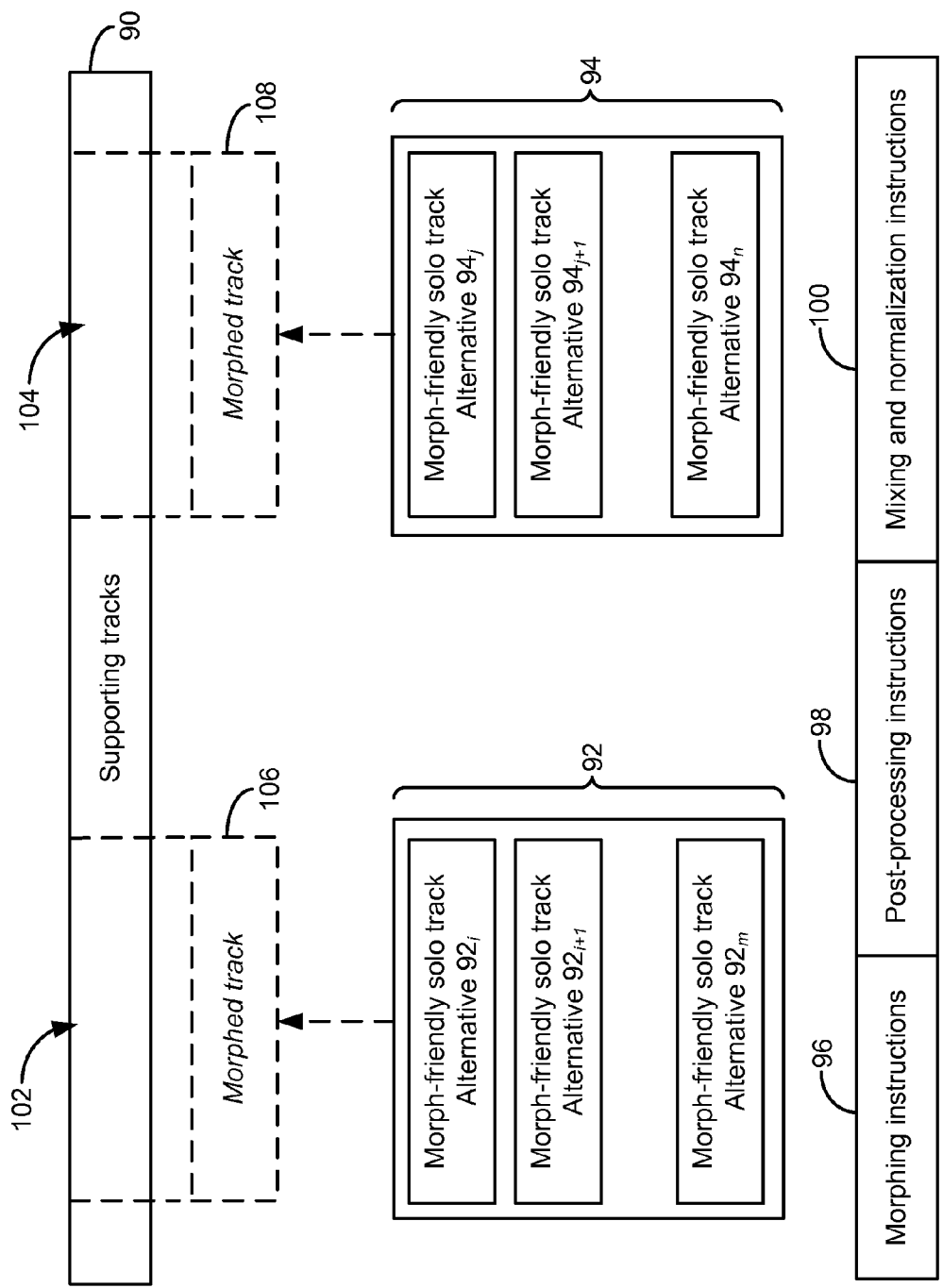
FIG. 5 is a block diagram of data read to a media player from a storage medium, illustrating a playback process with the media player.

FIG. 5 is a block diagram of data read to media player 50 (shown in FIG. 3), further illustrating the steps of method 68 (shown in FIG. 4). Pursuant to steps 72-80 of method 68, supporting tracks 90, morph-friendly solo tracks 92 (referred to as tracks $92_j, 92_{j+1}, \ldots, 92_m$), morph-friendly solo tracks 94 (referred to as tracks $94_j, 94_{j+1}, \ldots, 94_n$), morphing instructions 96, post-processing instructions 98, and mix/normalization instructions 100 are read from storage medium 52 to media player 50 (e.g., to RAM 60).

In the shown example, supporting tracks 90 relate to a pair of separate morph-friendly solo tracks 92 and 94, which are used to provide random variations in the playback of two time segments of supporting tracks 90. In particular, morph-friendly solo tracks 92 are used to modify a first time segment of supporting tracks 90, referred to as segment 102, and morph-friendly solo tracks 94 are used to modify a second time segment of supporting tracks 90, referred to as segment 104. In alternative examples, supporting tracks 90 may include only a single set of morph-friendly solo tracks, or may include three or more sets of morph-friendly solo tracks.

As discussed above, supporting tracks 90 are the intended background channels for a given song or songs. Morph-friendly solo tracks $92_i$, $92_{i+1}$, ..., $92_m$ are a first set of alternative morph-friendly solo tracks configured to be morphed and combined with supporting tracks 90 at segment 102. Correspondingly, morph-friendly solo tracks $94_j$, $94_{j+1}$, ..., $94_n$ are a second set of alternative morph-friendly solo tracks configured to be morphed and combined with supporting tracks 90 at segment 104.

Accordingly, pursuant to step 82 of method 68, media player 50 applies morphing instructions 96 and randomly combines morph-friendly solo tracks $92_i$, $92_{i+1}$, ..., $92_m$ to provide morphed track 106, and randomly combines morph-friendly solo tracks $94_j$, $94_{j+1}$, ..., $94_n$ to provide morphed track 108. After the morphing process is complete, pursuant to step 84 of method 68, media player 50 applies post-processing instructions 98 to post process morphed tracks 106 and 108, as discussed above.

Pursuant to step 86 of method 68, media player 50 then applies mix/normalization instructions 100 and combines, mixes, and normalizes morphed tracks 106 and 108 with supporting tracks 90 to produce a resulting acoustic image. The acoustic image includes supporting tracks 90 with morphed tracks 106 and 108 located respectively at segments 102 and 104.

Media player 50 may then playback the acoustic image. Upon reaching segment 102 in the acoustic image, the mix of supporting tracks 90 and morphed track 106 provides a first random playback of that particular music piece. Then, upon reaching segment 104 in the acoustic image, the mix of supporting track 90 and morphed track 108 provides a second random playback of that particular music piece.

During a subsequent playback of the same song with media player 50, pursuant to step 82 of method 68, media player 50 applies morphing instructions 96 and randomly combines morph-friendly solo tracks $92_i$, $92_{i+1}$, ..., $92_m$ to provide a new morphed track 106, and randomly combines morph-friendly solo tracks $94_j$, $94_{j+1}$, ..., $94_n$ to provide a new morphed track 108. Due to the random pattern of the morphing process, the new morphed tracks 106 and 108 have different audible characteristics from the previous morphed tracks 106 and 108.

After the morphing process is complete, pursuant to step 84 of method 68, media player 50 applies post-processing instructions 98 to post process the new morphed tracks 106 and 108. Pursuant to step 96 of method 68, media player 50 then applies mix/normalization instructions 100 and combines, mixes, and normalizes the new morphed tracks 106 and 108 with supporting tracks 90 to produce a resulting acoustic image. The acoustic image includes supporting tracks 90 with the new morphed tracks 106 and 108 located respectively at segments 102 and 104. The differences between the previous and new morphed tracks 106 and 108 accordingly simulate the variations provided by live musical performances.

Figure 6:
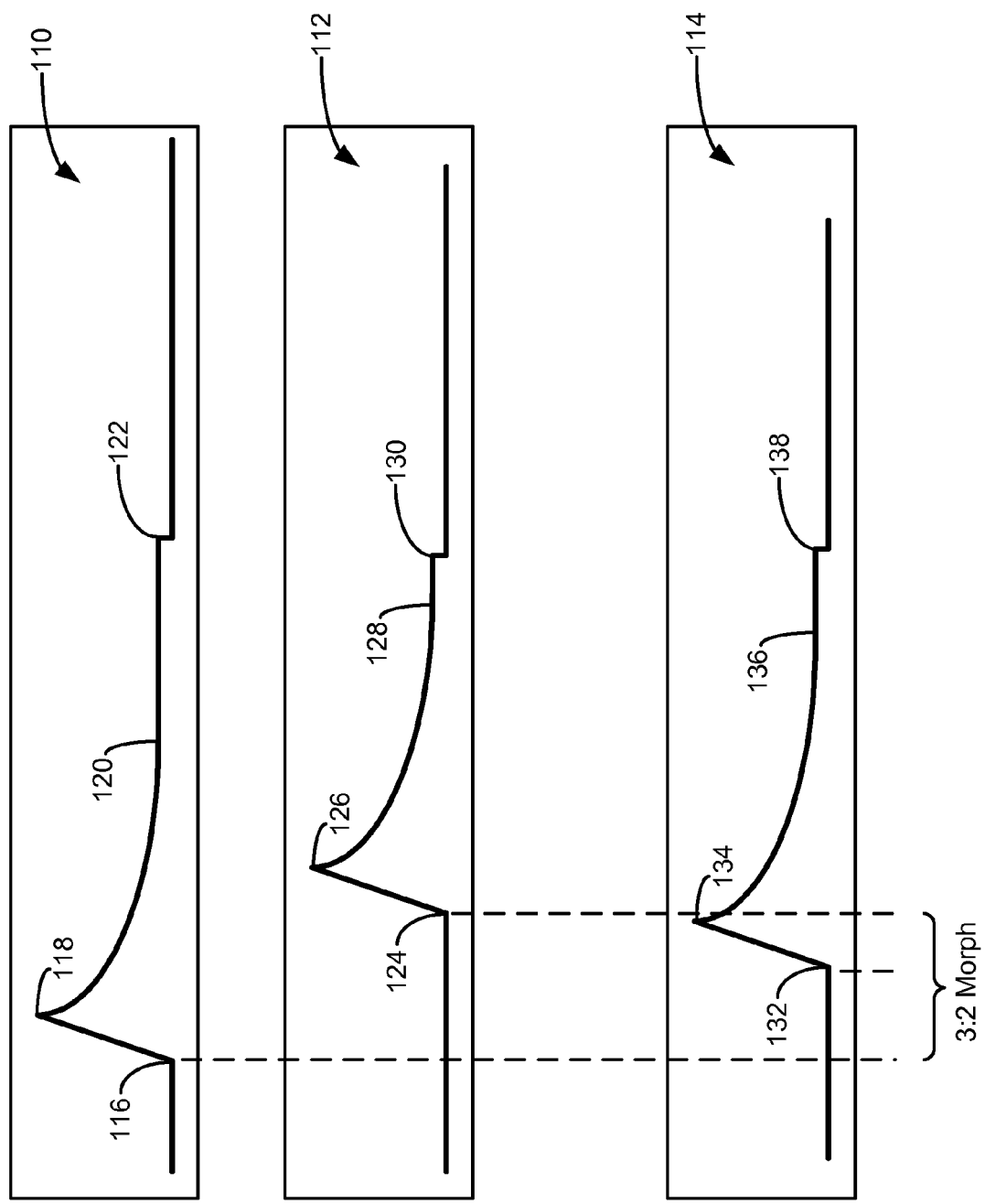
FIG. 6 depicts waveform diagrams for a pair of morph-friendly solo tracks and for a morphed track, illustrating an example morphing process.

FIG. 6 depicts waveform diagrams for morph-friendly solo tracks 110 and 112, and a waveform diagram for morphed track 114, which illustrate the morphing process pursuant to step 82 of method 68 (shown in FIG. 4). The morph-friendly format desirably allows the solo tracks to be morphed in a manner that interpolates between two or more solo tracks to generate a performance that an artist could have been expected to produce. For example, a live performance looks to change slightly the timing, emphasis, and possibly pitch of the performed notes, instead of the nature of the voice or instrument used. This is in comparison to techniques that smoothly vary the timbre or type of sound from one instrument to another. Accordingly, the solo tracks are desirably based on studio track performances, rather than a waveform generated by microphone, which would otherwise require the features significant to the human ear to be extracted.

The discipline of lossy acoustic data compression has developed techniques for identifying features that are significant to the ear. For example, linear predictive coding (LPC) is a source modeling technique in which a voice or instrument is represented by a relatively simple mathematical model based on the physics of human anatomy or an instrument's design. In linear predictive coding, the signal is represented as actions of the elements of the model plus error terms. The time-stamped actions of the model elements can be used like a Musical Instrument Digital Interface (MIDI) event as features of similar studio tracks, thereby providing a basis for the morph of those tracks.

LPC generally identifies frequencies as resonant poles, anticipates subsequent waveform as a linear juxtaposition of those resonances, and includes in the data stream the significant deviations of the waveform from those predictions. The pitch, attack, and dynamic information needed for morphing is therefore made available as a part of the LPC compression process. LPC is commonly used for speech recognition, in part because it identifies the time-stamped physical actions performed by the speaker. That characteristic makes it suitable as a morph-friendly format.

Wavelet techniques decompose sounds into time-stamped tone bursts of varying frequency and envelop. Wavelet descriptions are also suitable morph-friendly formats since the temporal positions, pitches, and envelops of components of source performances can be compared and interpolated.

In an alternative embodiment, a MIDI protocol may be used as a morph-friendly format. The MIDI protocol defines music as a time series of events. For example, a tone can have attack, decay, sustain, and release events with different timestamps. Tones are associated with instrument presets, programs, or patches; these are predefined separately from the MIDI stream. Since the MIDI stream is basically exactly the event information the morph technique needs, without the confusing addition of actual music, it is a suitable example of a morph-friendly format. Since the MIDI device has already been optimized for production quality sound output, generally little additional processing is required, and the post processing recipe would have modest content.

In an additional alternative embodiment, the solo tracks may converted from a morph-unfriendly format to a morph-friendly format. Examples of morph-unfriendly formats include those having complex acoustic images. For example, a recording of a gong sounding in a cathedral may have no clear indication of when a note starts, or stops, or even what pitches are involved. Similarly, a recording of a symphony orchestra can be such a complex sound that automated morphing techniques should expect great difficulty identifying the features of interest of particular solo voices, and experience an equally difficult time generating smooth blends between the tracks. Such raw recordings of complex acoustic images can be characterized as morph-unfriendly formats.

Another way to generate a morph-unfriendly format is to introduce a significant amount of post processing. A simple sine wave, after processing with choir effects, echo, ping pong, and pitch modification, can again become too complex for the morphing techniques to readily accommodate.

MPEG compression is outstanding in its ability to reduce bandwidth requirements with little reduction in perceived sound quality. It operates generally by dividing a signal into frequency bands, determining dominant tones within those bands, and eliminating signal components near those dominant tones in frequency masked by the psychoacoustic process of hearing. The result, however, does not contain the kind of event information required by a morphing process.

The morphing process is desirably performed on solo tracks converted to morph-friendly formats, such as a linear predictive coding format and/or a wavelet format. For example, as shown in FIG. 6, a pair of waveform diagrams for morph-friendly solo tracks 110 and 112 are being morphed together to generate a waveform diagram for morphed track 114. As shown, the waveform diagram of track 110 includes attack point 116, decay point 118, sustain point 120, and release point 122, which are points of a particular instrument preset occurring at four timestamps. Similarly, track 112 includes attack point 124, decay point 126, sustain point 128, and release point 130, which are points of the same instrument preset. A 3:2 temporal morph of tracks 110 and 112 generates morphed track 114 having attack point 132, decay point 134, sustain point 136, and release point 138, where each event occurs proportionately at 3:2 in time between the timestamps of tracks 110 and 112.

The 3:2 temporal morph illustrates an example of a random morphing performed on tracks 110 and 112 to produce morphed track 114. During a subsequent playback of the same song, the random morphing would likely produce a different pattern, such as a 1:1 temporal morph, thereby providing a different morphed track from morphed track 114. The randomization of each morphing may be attained in a variety of manners, such as with a random number generator.

In one embodiment, the random morphing may be weighted towards or against one or more morph-friendly solo tracks. For example, weighting of the random morphing may be based on consumer preferences, thereby providing higher weights to more preferred eLive performances and lower weights to less preferred eLive performances.

Additionally, the consumer may interact with the eLive performances and provide feedback of his or her satisfaction level of each eLive performance. For example, the consumer using media player 50 (shown in FIG. 3) may operate user interface 54 to select his or her preferences on the playbacks. After reactions to several eLive performances of the same song have been registered, media player 50 can invoke adaptations to optimize the morphing process (e.g., weigh one or more of the morph-friendly solo tracks).

For example, if a consumer consistently responds well to performances containing much of solo track A, and the consumer responds poorly to performances containing much of solo track B, media player 50 can weigh the morphs more heavily towards solo track A and less towards solo track B. Furthermore, if desired, the consumer may transmit his or her satisfaction levels to the producer or other third party for guiding the artistic process and for marketing information.

Furthermore, the random morphing process and post-processing of the morphed tracks may assist in reducing piracy of the songs, since pirating any particular eLive performance has reduced value compared to the full spectrum of eLive performances. Moreover, the higher complexity of the data format on the storage media provide for a next generation of encryption, steganography, and the like, if desired; and media players incorporating more sophisticated playback hardware for the post-processing step can also provide content protection.

Accordingly the method of the present disclosure is suitable for producing electronically-simulated live ("eLive") musical performances from static recorded information, stored as one or more supporting tracks and two or more morph-friendly solo tracks. During each playback of a song, a media player generates a random combination of the morph-friendly solo tracks to provide a morphed track. The morphed track may then be post-processed and combined with respective supporting tracks to provide an audio performance of the song. The entire process is desirably performed in near-real time to minimize delays in playing the given song. The different morphed tracks accordingly simulate the variations provided by live musical performances, thereby allowing artists to show a greater range of artistic approaches.

Although the present disclosure has been described with reference to preferred embodiments, workers skilled in the art will recognize that changes may be made in form and detail without departing from the spirit and scope of the disclosure.

The invention claimed is:

1. A method for producing an electronically-simulated live musical performance, the method comprising:
reading a plurality of morph-friendly solo tracks from a storage medium with a processor of a media player;
morphing the plurality of morph-friendly solo tracks based on a random morphing pattern with the processor to produce a morphed track;
reading post-processing instructions from the storage medium with the processor;
applying the post-processing instructions to the morphed track with the processor;
reading at least one supporting performance track from the storage medium with the processor; and
combining the morphed track and the at least one supporting performance track to produce an audible performance with the processor, wherein the audible performance has audible characteristics that are different from audible characteristics of a previous audible performance due to the random morphing pattern.

2. The method of claim 1, wherein the post-processing instructions comprise effects selected from the group consisting of amplification, digitization, data compression, normalization, dubbing, equalization, dynamic compression, dynamic expansion, pitch correction, de-essing, thickening and enhancing, harmonization, delay formation, time alignment, tempo change, and combinations thereof.

3. The method of claim 1, and further comprising:
reading mixing and normalization instructions from the storage medium with the processor;
wherein combining the morphed track and to the at least one supporting performance track comprises applying the mixing and normalization instructions to the morphed track and to the at least one supporting performance track with the processor.

4. The method of claim 2, and further comprising playing the audible performance with the media player.

5. The method of claim 1, wherein the morph-friendly solo tracks are provided in a format selected from the group consisting of a linear predictive coding format, a wavelet format, and combinations thereof.

6. The method of claim 1, wherein random morphing pattern comprises a weighted random morphing pattern.

7. The method of claim 1, and further comprising recording user preferences of the morphing with the processor of the media player.

8. A storage medium configured to be read by a processor of a media player, the storage medium comprising:
a plurality of morph-friendly solo tracks;
at least one supporting performance track;
morphing instructions configured to morph the morph-friendly solo tracks into a morphed track based on a random morphing pattern;
post-processing instructions configured to be applied to the morphed track of the morph-friendly solo tracks; and
mixing and normalizing instructions configured to be applied to the morphed track and to the at least one supporting performance track to produce different audible performances with the processor, wherein the different audible performances have audible characteristics that vary from each other due to the random morphing pattern.

9. The storage medium of claim 8, wherein the morph-friendly solo tracks are in a non-post-processed state.

10. The storage medium of claim 8, wherein the at least one supporting performance track is in a post-processed state.

11. The storage medium of claim 10, wherein the at least one supporting performance track is further in a mixed and normalized state.

12. The storage medium of claim 8, wherein the morph-friendly solo tracks are in a format selected from the group consisting of a linear predictive coding format, a wavelet format, and combinations thereof.

13. The storage medium of claim 8, wherein the at least one supporting performance track comprises a plurality of supporting performance tracks.

14. A method for producing an electronically-simulated live musical performance with a media player having a processor, the method comprising:
reading a first set of morph-friendly solo tracks and a second set of morph-friendly solo tracks from a storage medium with the processor;
producing a first morphed track by morphing the first set of morph-friendly solo tracks based on a random morphing pattern with the processor;
producing a second morphed track by morphing the second set of morph-friendly solo tracks based on the random morphing pattern with the processor;
combining the at least one supporting performance track with the first morphed track and the second morphed track such that the first morphed track is located at a first time segment of the at least one supporting performance track and the second morphed track is located at a second time segment of the at least one supporting performance track, thereby producing an audible performance with the processor; and
playing the audible performance with the media player, wherein the played audible performance has audible characteristics that are different from audible characteristics of a previous audible performance due to the random morphing pattern.

15. The method of claim 14, and further comprising:
reading post-processing instructions from the storage medium with the processor;
applying the post-processing instructions to the first morphed track and the second morphed track with the processor prior to the combining step.

16. The method of claim 14, wherein the morph-friendly solo tracks of the first set and the second set are each provided in a format selected from the group consisting of a linear predictive coding format, a wavelet format, and combinations thereof.

17. The method of claim 14, wherein the media player comprises a portable multimedia player, and wherein the storage medium comprises a data storage device of the portable media player or an optical medium readable by the portable media player.

18. The method of claim 14, wherein the morph-friendly solo tracks of the first set and the second set are each in a non-post-processed state.

19. The method of claim 14, wherein the at least one supporting performance track is in a post-processed state.

20. The method of claim 14, wherein combining the at least one supporting performance track with the first morphed track and the second morphed track comprises mixing and normalizing the at least one supporting performance track with the first morphed track and the second morphed track.

* * * * *